May 18, 1943.  G. A. UNGAR  2,319,374
BALANCED PUMP AND MOTOR
Filed June 28, 1939  5 Sheets-Sheet 1
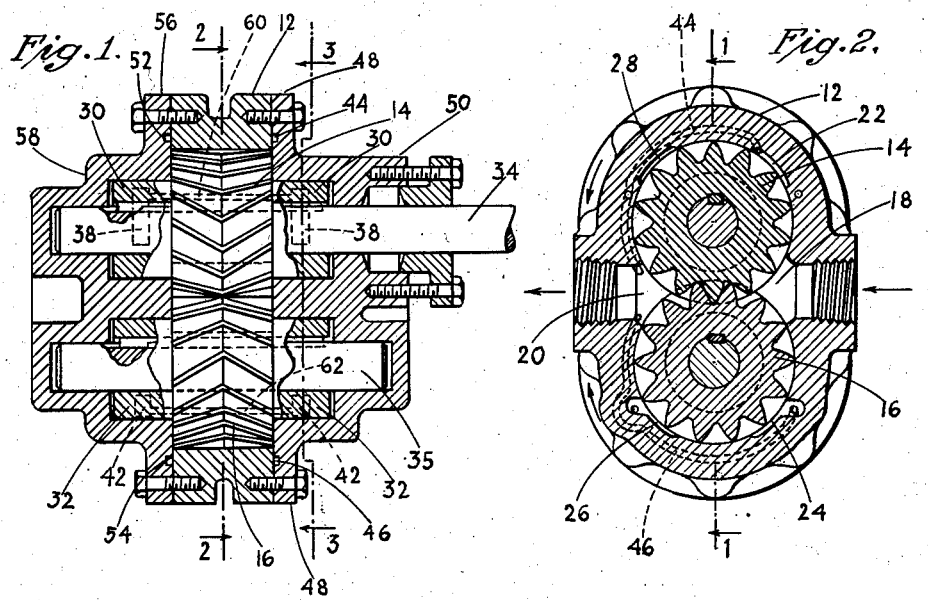
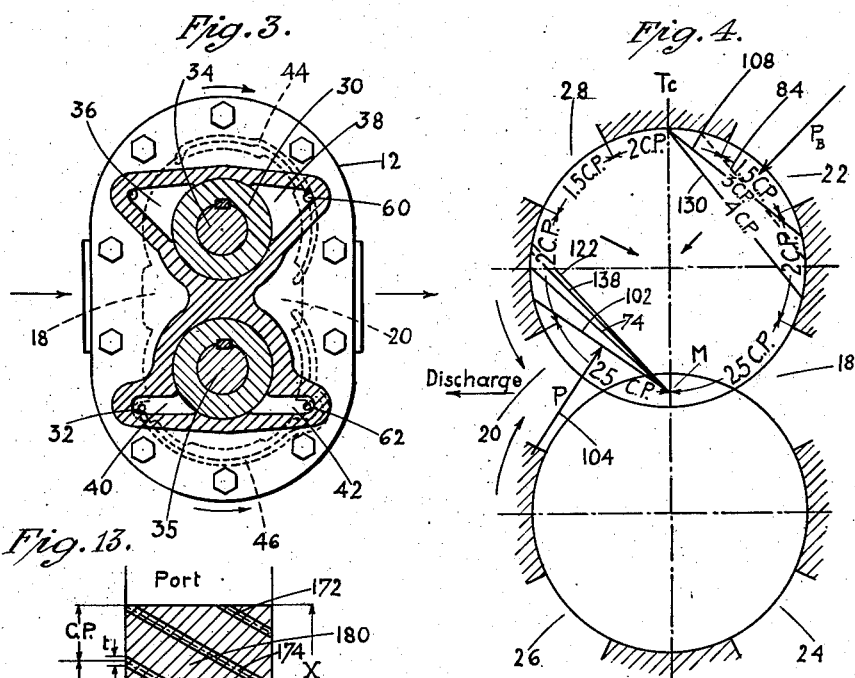
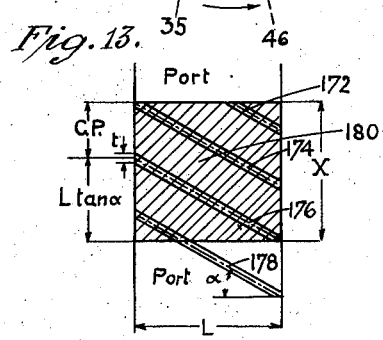
INVENTOR
GUSTAVE A. UNGAR
BY
ATTORNEY

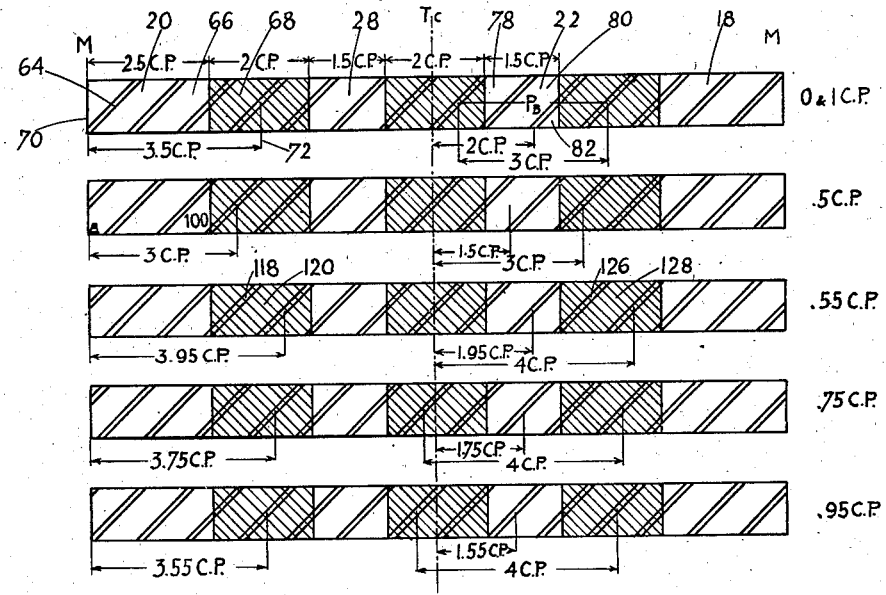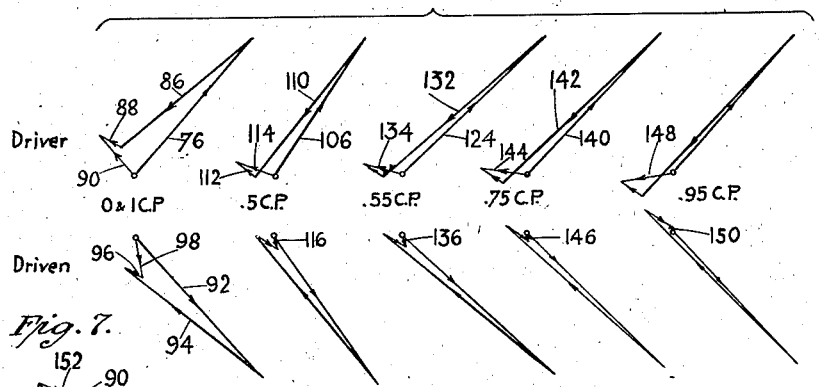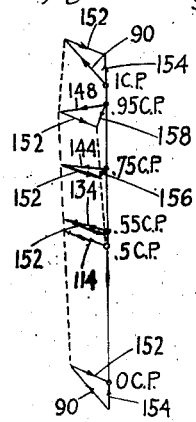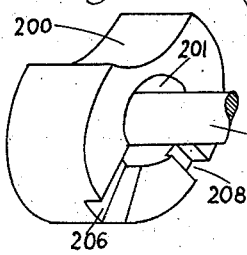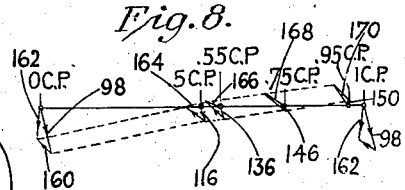

May 18, 1943. G. A. UNGAR 2,319,374
BALANCED PUMP AND MOTOR
Filed June 28, 1939 5 Sheets-Sheet 3

INVENTOR
GUSTAVE A. UNGAR
BY
ATTORNEY

May 18, 1943. G. A. UNGAR 2,319,374
BALANCED PUMP AND MOTOR
Filed June 28, 1939 5 Sheets-Sheet 4
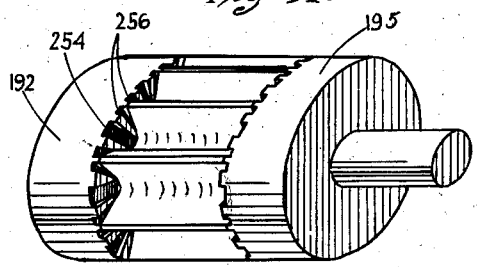
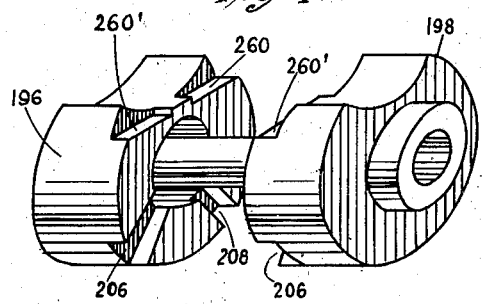
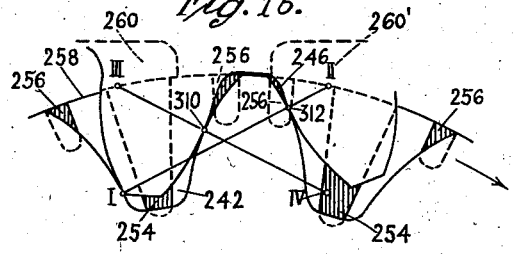
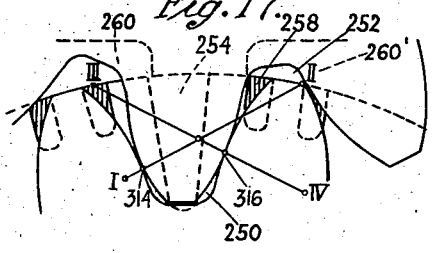
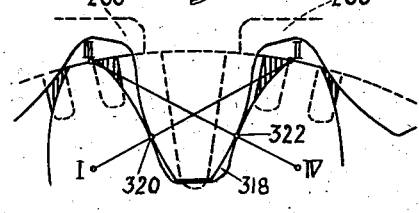
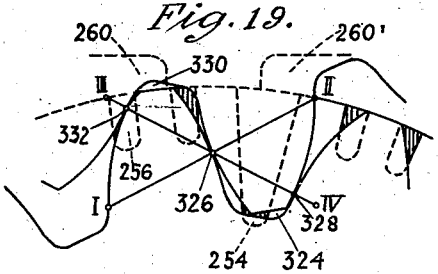
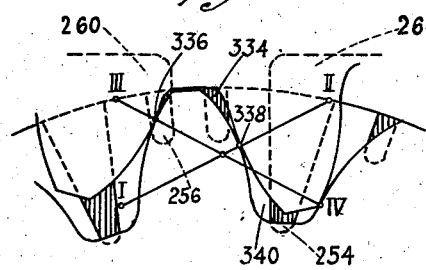
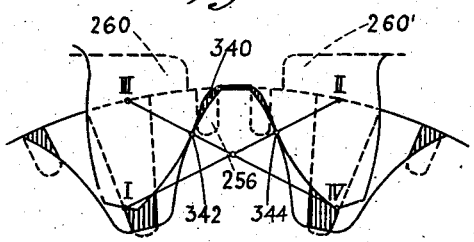
INVENTOR
GUSTAVE A. UNGAR
BY *James K. Franklin*
ATTORNEY

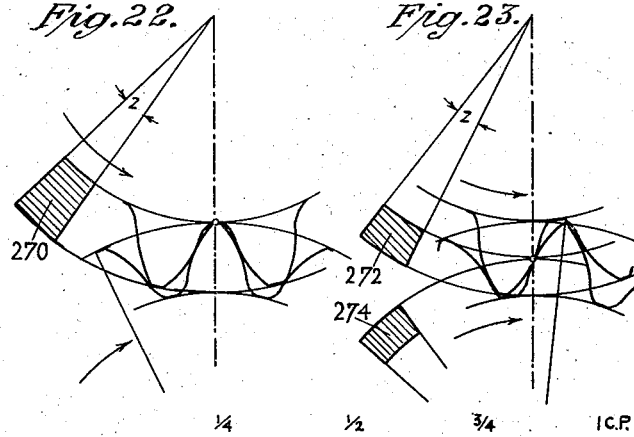
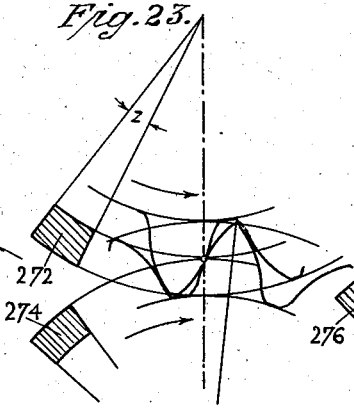
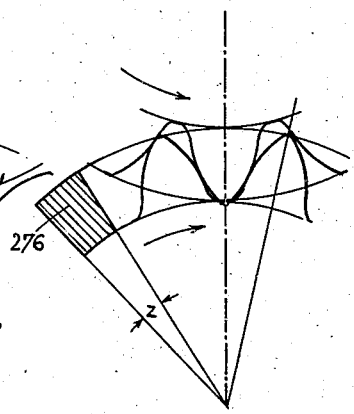
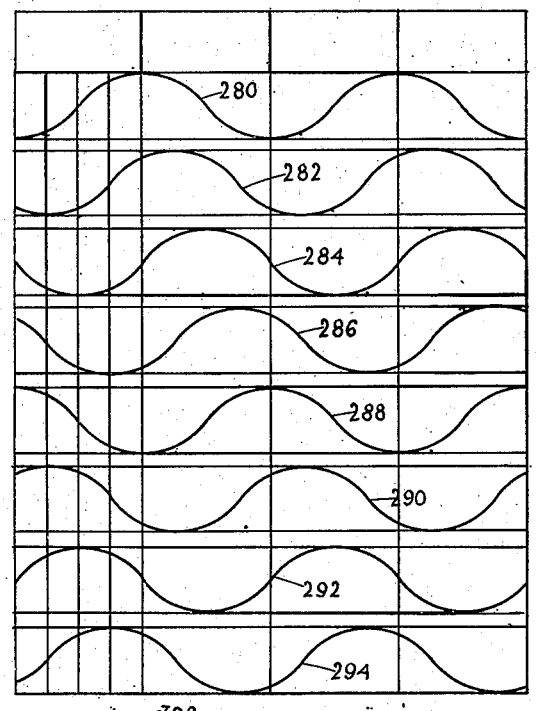
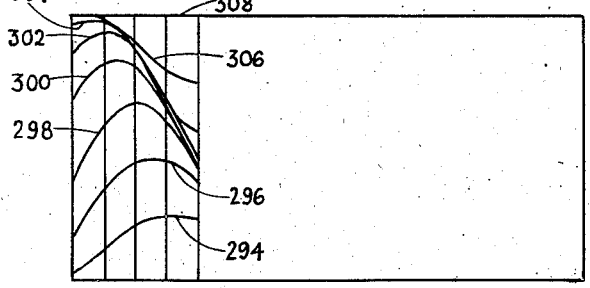

Patented May 18, 1943

2,319,374

UNITED STATES PATENT OFFICE.

2,319,374

BALANCED PUMP AND MOTOR

Gustave A. Ungar, Pelham Manor, N. Y., assignor to Joseph F. Keller, New York, N. Y.

Application June 28, 1939, Serial No. 281,522

15 Claims. (Cl. 103—126)

This invention relates to pumps and motors having cooperating rotors provided with a plurality of meshing lobes or teeth. While the invention is applicable broadly to structures of the class described, whether acting as a pump or as a motor, and whether using large lobes or small gear teeth, I shall hereinafter, for convenience of reference, refer to the structure as a gear pump, but this is not intended to so limit the invention.

The primary object of the present invention is to generally improve gear pumps, and a more particular object is to improve balanced pumps of the type disclosed in my co-pending application Serial Number 177,711, filed December 2, 1937, which has matured into Patent 2,236,980, issued April 1, 1941, and entitled "Liquid pump and motor improvements."

In the aforesaid application, I disclose a pump having balancing ports in the casing, which ports open onto the rotors, said ports being appropriately connected to the inlet and outlet passages of the pump with a view to substantially balancing the radial forces exerted on the rotors. A close balance is not obtainable by the use of these main balancing ports alone, for the effective area of the port on the rotor includes all of the tooth spaces in communication with the port, hence there are abrupt rather than gradual changes in the effective area and location of the balancing ports. A residual unbalance remains, and one primary object of my invention is to largely eliminate this residual unbalance. To accomplish this, I provide the rotor with additional smooth, continuous rotating surfaces which may, for convenience, be called "balance rings" or "rotor rings," and I apply auxiliary balancing forces of desired direction and amount to the rotor rings. With this construction there is no limitation on the proper selection of the direction and the amount of the auxiliary balancing forces, for they are applied to smooth, cylindrical surfaces.

In my aforesaid co-pending application Serial Number 177,711, Patent 2,236,980 the pump is adapted for use with liquids of variable temperature, by providing so-called "abutments" at the ends of the rotors, said abutments being relatively movable in an axial direction within the casing in order to accommodate longitudinal expansion or contraction of the rotors. My present improvement may be applied to gear pumps either with or without such abutments. When the pump is not provided with abutments, the rotor rings may take the form of hub-like extensions, and the casing is shaped to fit closely about the rotors and hubs. The casing is provided with main balancing ports opening onto the rotors, and with auxiliary balance ports opening onto the hubs. When, however, the pump is provided with abutments, then the casing is provided with auxiliary balancing ports opening onto the rotatable abutments of the driving rotor. Similar ports cannot be beneficially applied to the abutments of the driven rotor, because these are non-rotatable. Instead, the driven rotor is provided with hub-like extensions which are received within the stationary abutments, and the necessary auxiliary balancing ports lead through the stationary abutments to the rotating hubs. In a pump of this class, the rotor rings for the driving rotor are combined with the rotating abutments, and the rotor rings for the driven rotor are hubs received in the stationary abutments.

As so far described, the invention is applicable to pumps of either the spur gear or helical gear type. A further feature of the invention relates to pumps of the helical gear type. An important advantage of helical gearing is to avoid mechanical gear noise. For this purpose, the length of the rotor should be at least great enough to provide a lead equal to or exceeding the tooth pitch, for otherwise, as is well known, the benefit of using the helical teeth is lost. When pumping at high pressure, a pulsating flow will produce a hydraulic noise which is very disturbing. A further object of my invention is to so design a helical gear pump as to avoid hydraulic as well as mechanical gear noise. I have found that in order to avoid hydraulic noise, the length of the rotor should be selected so that the lead changes in increments of one-quarter pitch. Thus the shortest rotor should be long enough to provide a lead of one tooth pitch, and any additional rotor length needed for adequate pump capacity should be added in increments of lead equal to one-quarter of the tooth pitch.

A further feature and object of the invention centers about the prevention of trapping of liquid in the space between the teeth of the cooperating rotors. For this purpose, radial slots are provided between the ends of the rotor and the adjacent faces of the rotating abutments. In my aforesaid co-pending application Serial Number 177,711, Patent 2,236,980, it was suggested that these slots be cut in the ends of the gear teeth. This, however, leads to the disadvantage of losing considerable effective tooth surface, and increases the wear of the pump. In accordance with the present improvement, the radial slots are provided on the inner faces of the abutments, so that there is no mutilation of the gear teeth and no loss of effective tooth area taking the gear load.

To the acomplishment of the foregoing and other more specific objects which will hereinafter appear, my invention consists in the gear pump elements and their relation one to the other, as hereinafter are more particularly described in the specification and sought to be defined in the claims. The specification is accompanied by drawings in which:

Fig. 1 is a section taken in elevation through a helical gear pump embodying features of my invention, this section being taken in the plane of the line 1—1 of Fig. 2;

Fig. 2 is a transverse section taken in the plane of the line 2—2 of Fig. 1;

Fig. 3 is a transverse section taken in the plane of the line 3—3 of Fig. 1;

Fig. 4 is a diagram explanatory of the method of computing the main forces on the rotor;

Fig. 5 represents a development of the ports with the rotor in different positions;

Fig. 6 is a vector analysis of the main forces on the rotors to determine the unbalance which exists when not using the auxiliary balancing means of the present invention;

Fig. 7 is a vector analysis of the residual force on the driving rotor;

Fig. 8 is a vector analysis of the residual force on the driven rotor;

Fig. 13 is explanatory of a feature of the invention;

Fig. 14 illustrates the provision of escape slots in the inner faces or ends of the abutments adjacent the rotor;

Fig. 15 illustrates the abutments for the driven rotor;

Figs. 16 through 21 are explanatory of the action of the escape slots;

Figs. 22 through 24 are explanatory of the cause of fluctuating delivery from a gear pump;

Figure 9:
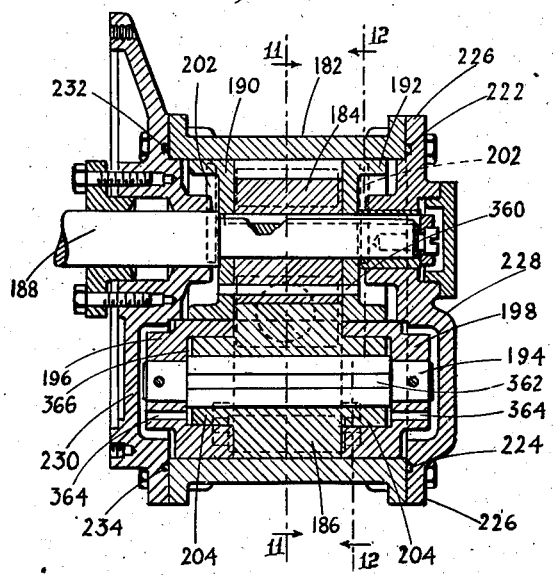
Fig. 9 is a section taken in elevation through a spur gear pump, and shows the application of my invention to a pump provided with abutments to acommodate axial expansion, this section being taken in the plane of the line 9—9 of Fig. 11.
Figure 10:
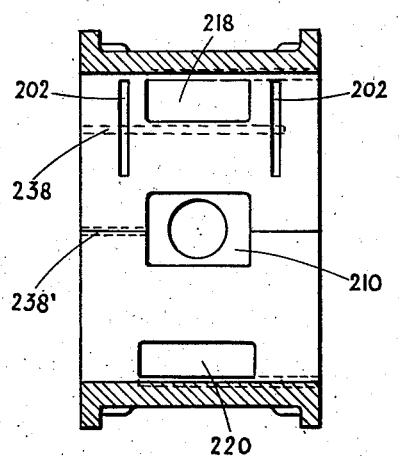
Fig. 10 is a similar section through the pump body, but with the rotors and end plates removed, and shows the main and some of the auxiliary balance ports.

Fig. 25 plots in superposed relation the fluctuating delivery of successive incremental sections;

Fig. 26 shows the summation of the deliveries of the sections; and

Fig. 27 illustrates abutments like those shown in Fig. 15, but modified for use with helical gears.

Referring to the drawings, and more particularly to Figs. 1, 2 and 3, I there show a gear pump comprising a casing 12 housing a driving rotor 14 meshing with a driven rotor 16. The casing is provided with ports or passages on opposite sides of the rotor, and for purposes of the present description, I shall assume a direction of rotation indicated by the arrows in Fig. 2, in which case the passage 18 acts as an inlet passage, while passage 20 acts as a discharge passage. Referring to Fig. 2, the casing 12 is provided with main balancing ports 22, 24, 26 and 28, these ports opening onto the rotors 14 and 16 and being appropriately connected to the inlet and discharge passages 18 and 20.

The use of these main balancing ports is disclosed in my co-pending application Serial Number 177,711, Patent 2,236,980, previously referred to. However, there are limitations on the accuracy and effectiveness of the balance obtainable when dealing with ports opening directly onto the rotor, for the force exerted on the rotor does not vary in exact accordance with the dimension of the balancing port, and instead, varies in abrupt changes corresponding to the area of a tooth space, for when a port communicates with even a small part of a tooth space, the fluid pressure is applied to the entire tooth space.

By practical experiment, and by methods of analysis which I shall describe in greater detail hereinafter, I have found that a residual error remains despite the use of the main balancing ports, and that this error may include a reasonably constant component susceptible of correction by auxiliary balancing means. For this purpose, I provide the rotors with continuous cylindrical surfaces or "rotor rings" against which a balancing force may be applied in any desired direction and to any desired degree.

Referring now to Figs. 1 and 3, the rotor rings in the present case consist of hub-like extensions 30 and 32 on driving rotor 14 and driven rotor 16 respectively. These are caused to rotate with the rotors, as by making the same integral with the rotors, or by keying the rings 30 as well as rotor 14 to the driving shaft 34, and the rings 32 as well as rotor 16 to a driven shaft 35, as shown in the drawing. The rotor rings 30 are acted upon by auxiliary balancing ports 36 and 38 (Fig. 3) while the rotor rings 32 are acted upon by auxiliary balancing ports 40 and 42. It will be observed that these are differently located and dimensioned, and that there is absolute freedom in designing the auxiliary balancing means.

In respect to the main balancing ports, and referring to Fig. 2, the ports 22 and 24 which are approximately diametrically opposite the discharge passage 20, are pressure ports which are connected to discharge passage 20, as by means of the channels 44 and 46. These channels are located on the face wall of the flange 48 of end plate 50, as will be seen in Fig. 1. Similarly, the main ports 26 and 28 which are approximately diametrically opposite the inlet passage 18, are suction ports and are connected to inlet passages 18 by similar channels, which are not visible in Fig. 2, but which are shown at 52 and 54 in Fig. 1, they being located on the face wall of flange 56 of end plate 58. The main ports are necessarily located approximately diametrically opposite the inlet and discharge passages to which they are connected.

In Fig. 3, however, it will be observed that auxiliary port 38 is a pressure port connected at 60 to channel 44 and communicating with the discharge passage 20. Thus the discharge passage is connected to the adjacent rather than to the opposite auxiliary port. Similarly, the auxiliary port 36 is a suction port, and is connected to the adjacent inlet passage 18. These auxiliary ports are for the driving rotor. The auxiliary ports 40 and 42 for the driven rotor are connected to the opposite passages, much as in the case of the main ports. This difference arises from the fact that the tooth pressure is in opposite direction for the two rotors, as is subsequently described in greater detail.

The separated auxiliary ports at opposite ends of the rotor are connected together by means of communicating passages such as the passage 60 between ports 38 (Fig. 1) and the passage 62 between the ports 42 (Fig. 1).

The theory underlying the design of the auxiliary balancing means may be explained with reference to Figs. 4 through 8 of the drawings. It is assumed that the optimum design for the main balancing ports is already fixed, and this is schematically indicated in Fig. 4, in which the inlet passage is indicated at 18, the discharge passage at 20, the main pressure balancing ports at 22 and 24, and the main suction balancing ports at 26 and 28. The rotors in this case are equal in diameter. The ports have the same axial length as the passages and the rotors, while the peripheral dimension is indicated on Fig. 4 in terms of tooth pitch. The surface of one side of a rotor may be developed as is indicated in Fig. 5. The cross-hatched portions represent the casing around the rotor, while the clear portions represent the ports. The discharge passage (for one rotor) is indicated at 20, the suction balance port at 28, the pressure balance port at 22, and the inlet passage at 18. The diagonal pairs of lines 64 represent the outer edges of the helical teeth. The balance ports in this particular case are one and one-half pitches in length, while the effective length of the inlet and discharge passages is two and one-half pitches, as is marked on the diagram of Fig. 4.

Although the diagram applies to one side only of the helical gear, it will be understood that the other side with its oppositely sloping teeth is a duplicate of the side shown. The entire theoretical treatment may be based on one side of the helical gear, and the results obtained are equally applicable to the complete gear or herringbone gear, the latter preventing axial thrust resulting from mechanical tooth pressure.

In the top line of Fig. 5, the rotor is assumed to be in a zero or starting position in which the meshing teeth of the driving and driven rotors are centered. They engage at the point M of Fig. 4. Strictly speaking, the point M is not fixed, but fluctuates with the movement of the teeth. However, the error in assuming point M to be fixed is very slight.

The effective area differs from the actual area of the ports. Thus, referring to Fig. 5, the discharge port 20 admits pressure fluid to the tooth space 66, and also to the tooth space 68, hence the effective port area extends from the center or point of contact of the rotor teeth represented by the left-hand end 70 of the diagram to the point 72 which is the mid point of the tooth edge bounding the tooth space 68. This, it will be seen, amounts to three and one-half circular pitches.

Reverting now to Fig. 4, a line 74 is drawn from the mid point or contact point M to the periphery of the rotor, this line 74 having a length such that it subtends an arc equal to three and one-half pitches. The direction of the forces on the rotor at the discharge port 20 is a line perpendicular to the line 74. Referring now to Fig. 6, a vector 76 is drawn, this being perpendicular to the line 74 and having a length equal to three and one-half pitches (for a given pressure and a given rotor length, the force is proportional to the exposed peripheral dimension of the rotor).

Referring now to Fig. 5, the pressure balance port 22 admits pressure fluid to the tooth spaces 78, 80 and 82, and the length of the exposed rotor area is three pitches, located as shown. The center of this area is displaced from the top center (Tc) of the casing by the amount of two pitches, as is indicated on the diagram.

Referring now to Fig. 4, a line 84 (shown as a dotted line) is drawn which subtends an arc of three pitches and which is located symmetrically about a point two pitches away from the center point Tc. The balancing force is exerted at right angles to this line and is drawn in Fig. 6 as the vector 86, which is three pitches in length.

There is next added a vector 88 representing the mechanical tooth pressure. This is made up of two components, a horizontal component for the tangential load, and a vertical component representing the separating force on the gears. To determine the dimension of this vector it is necessary to assume a pump efficiency, which in the present case is assumed to be seventy per cent. The magnitude and direction of vector 88 is determined by methods which are standard in gear design.

The resultant of this vector addition is indicated by vector 90, the latter representing the residual or unbalanced force acting on the driving rotor.

A similar vector analysis may be made for the driven rotor. Thus, in Fig. 6, the vector 92 represents the pressure on the driven rotor at the discharge port, and the vector 94 represents the corrective or balance force obtained at the pressure balance port 24. The gear force is indicated at 96, this being in a direction opposite to the vector 88, because in a driven gear the pressure is applied from the outside to the gear, whereas in a driving gear the pressure is a reaction against the driving gear by the driven gear. The resultant of the vector addition is vector 98 which represents the residual or unbalanced force on the driven rotor.

The foregoing analysis is true for one rotor position, and the analysis must be repeated for each of a number of representative rotor positions. Thus, in the second line in Fig. 5, it is assumed that the rotors have moved one-half of a pitch, and the various diagonal pairs of lines representing the tooth edges are accordingly displaced relative to the ports by one half of a pitch.

The discharge port admits liquid to the tooth space 100, hence the total exposed area is three pitches, as indicated. In Fig. 4 this corresponds to the line 102, and the direction of the force exerted is represented by the arrow 104. In Fig. 6 this is laid out as the vector 106, which is three pitches in length. Reverting to Fig. 5, the pressure balance port 22 admits liquid to the same tooth spaces as before, so that the exposed area is three pitches in length, but the center of this area is now only one and one-half pitches from the top center of the pump. Referring to Fig. 4, this corresponds to the line 108. The balance force may be represented by a vector which is perpendicular to line 108, and in Fig. 6 this vector is indicated at 110, which is three pitches in length. The gear pressure is added at 112, leaving a residual unbalance 114. In the case of the driven rotor, the residual unbalance is indicated at 116.

Again referring to Fig. 5, and more particularly the third line, the rotors have moved an amount equal to the thickness of the tooth edge (specifically .05 pitch from the preceding position). This is just enough to admit pressure fluid to the far side of tooth edge 118 so that the tooth space 120 is exposed to pressure. The effective area is then 3.95 pitches, which is represented on Fig. 4 by the line 122 and which results in a vector 124 in Fig. 6, this vector being 3.95 pitches in length. The balance port similarly begins to admit liquid to the far side of tooth edge 126, thus exposing the tooth space 128 to pressure. The total exposed area corresponds to four tooth pitches, and may be represented in Fig. 4 by the line 130. The balance force exerted on the rotor may be represented by a vector perpendicular to the line 130, this being the vector 132 in Fig. 6. Vector 132 is four tooth pitches in length. After adding the gear force, the residual unbalance is indicated by vector 134. This process is repeated for the driven rotor ending with the residual unbalance 136.

Returning again to Fig. 5, the fourth line represents a movement of three-fourths of a tooth pitch. The resulting area at the discharge port of 3.75 pitches is represented in Fig. 4 by the line 138. The perpendicular bisector of line 138 is represented in Fig. 6 by the vector 140. Returning now to Fig. 5, the exposed area at the pressure balance port is four tooth pitches, the center point being 1.75 pitches from the top center of the pump. A corresponding line is drawn in Fig. 4, which line has been omitted in the drawing for clarity. The perpendicular bisector of such line is represented in Fig. 6 by the vector 142. The residual unbalance is found at 144. Similarly, for the driven rotor, the residual unbalance is indicated at 146.

In the bottom line of Fig. 5, the rotors have moved .95 pitch, and in accordance with the foregoing process the resultant unbalance is found to be 148 for the driving rotor and 150 for the driven rotor. The next stage of movement is from 0.95 pitch to 1 pitch, which, of course, corresponds to zero pitch or to the first line of Fig. 5, for events repeat cyclically for each pitch of movement. The first vector-diagrams of Fig. 6 are therefore again applicable, and serve to complete the full cycle of movement.

In Fig. 7 the resultants or residual unbalance vectors for the driving rotor have been laid out one above the other as vectors 90, 114, 134, 144, 148 and back again to 90. It will be observed that these vectors have a main component which is surprisingly uniform. If this main or common component is counteracted by auxiliary balancing means, then the resultant unbalance is reduced to a comparatively small amount. In the present case, this preferred auxiliary correction is indicated by the vector 152, leaving a resultant unbalance of 154 in the zero position, zero in the .5 pitch position (vectors 114 and 152 being equal and opposite), almost zero in the .55 pitch position, vector 156 in the .75 pitch position, vector 158 in the .95 pitch position, and vector 154 again in the 1 pitch position.

The driving rotor should, therefore, be subjected to an auxiliary balancing force equivalent to the vector 152. The vector-diagrams of Figs. 6 and 7 have been drawn with the rotors rotating as shown in Fig. 4, which corresponds to Fig. 2, that is, the discharge side of the pump is at the left. It will be observed that vector 152 requires a force moving generally from left to right. It is for this reason that the auxiliary ports 38 are located adjacent the discharge passage of the pump, that is, on the left-hand side of the pump as viewed in Fig. 2. Port 38 is shown at the right-hand side of the pump in Fig. 3, but this is because the section of Fig. 3 looks in opposite direction to the section of Fig. 2, and in Fig 3 the discharge side of the pump is at the right rather than at the left. The location of the port is selected to provide a corrective of proper direction, and the quantitative size or area of the port is selected to provide a corrective of proper magnitude. This is readily done because of the freedom of design which results from applying the auxiliary corrective to the periphery of a smooth cylindrical surface such as the rotor rings 30.

The residual unbalance for the driven rotor is more nearly vertical than horizontal, and it is therefore more convenient to lay the same out along a horizontal line (instead of along a vertical line as was done in Fig. 7). Referring to Fig. 8, the residual at zero pitch position is 98; the residual at .5 pitch position is 116; at .55 pitch position, it is 136; at .75 pitch position it is 146; at .95 pitch position it is 150; and at 1 pitch position it is again 98. These vectors are subject to a correction which will help reduce the peak values, and thus minimize and level off the residual unbalance. In the present case, I have indicated a corrective vector 160. Applying this vector, the final residual unbalance is that indicated at 162 for the zero pitch position, at 164 for .5 pitch position, at 166 for .55 pitch position, at 168 for the .75 pitch position, 170 for the .95 pitch position, and again 162 for the 1 pitch position.

The desired corrective vector 160 is directed generally from right to left, and this explains why the auxiliary pressure port 40 is located opposite the discharge passage 20. It will also be noted that the corrective vector 160 has a substantial upward component, which explains why the port 40 is located far down around the rotor ring, as will be clearly seen in Fig. 3. The size of the port is small because the dimension of the corrective vector is small. Here again the designer is free in his choice because the auxiliary port opens upon a smooth cylindrical surface provided by the rotor ring.

This entire process of vector analysis may be repeated for the suction ports. In general, however, it is desirable to make the pump symmetrical so that it may be rotated in either direction and so that either side may be used for inlet or discharge. If it is assumed that the inlet passage and main suction balancing ports are the same in dimension as those for the pressure side of the pump, then the vector analysis previously given is applicable to the suction as well as the pressure ports. Naturally, the quantitative degree of suction may be very different from the quantitative value of pressure, besides being negative instead of positive, but that does ont affect the results because the vector analysis is in terms of port area, the pressure being fixed by the fact that the pressure balancing ports are connected to the pressure side of the pump, and similarly, the suction balancing ports are connectd to the suction side of the pump, so that a symmetrical design may therefore be employed.

There is one important limitation in respect to the main ports, when working with helical teeth, and this limitation may be explained with reference to Fig. 13. Successive tooth edges are indicated at 172, 174, 176 and 178. Successive ports are shown with a casing wall 180 therebetween. If the ports are brought too close together, the casing wall 180 may be inadequate to seal one port from the other, for the sloping tooth space tends to form a conduit between the ports. In Fig. 13 the ports are sealed apart by the two teeth 174 and 176. Upon a slight movement of the rotor, however, the ports will be separated by only a single tooth. In order to maintain a seal between the ports, the length of the casing wall 180 should equal the lead of the teeth plus at least one tooth pitch. The sealing action is then produced by the one tooth pitch, for the lead distance is ineffective to produce any sealing action. This lead, of course, varies with the axial length of the rotor for any given tooth angle, and is therefore expressed as the length times the tangent of the helix angle. Thus, from Fig. 13, I conclude that the minimum distance X between successive ports should equal a tooth pitch plus the product of the length of the rotor (one side only) and the tangent of the helix angle.

As so far described, the gear pump is arranged for radial balance, but no provision has been made for axial expansion of the rotors in the event of wide variations in temperature of the fluid being pumped. In my co-pending application Serial Number 177,711 previously referred to, I disclose the use of relatively movable abutments at the ends of the rotors to accommodate axial expansion. The auxiliary means for radial balance may be applied to such a pump. Referring to Figs. 9 through 12, I illustrate a spur gear pump comprising a casing 182 housing a driving rotor 184 and a driven rotor 186. The driving rotor is mounted on a driving shaft 188 which also carries abutments 190 and 192. This shaft may be conveniently held against axial movement outside of the pump. For instance, shaft 188 may be the extension of the armature shaft of a driving motor (not shown). The abutments 190 and 192 are circular and are keyed to shaft 188 and rotate with the shaft and rotor. The abutments are, however, axially movable within casing 182, thereby accommodating expansion of the rotor even when the casing does not similarly expand. The driven rotor 186 rotates freely about the stationary shaft 194. It is provided with stationary abutments 196 and 198, these being locked on shaft 194. The stationary abutments are cut away to receive the rotating abutments, as is clearly shown at 200 in Figs. 12 and 27. Here again, the abutments are movable within the casing to accommodate expansion of the rotor.

In accordance with the present invention, the presence of the cylindrical rotating abutments 190 and 192 on the driving rotor is taken advantage of to receive the desired auxiliary balancing force. For this purpose, auxiliary ports 202 (Figs. 10 and 12) are provided in casing 182, these ports opening directly onto the cylindrical outer surface of the rotating abutments. Thus the abutments are made to act also as rotor rings, and no special rotor rings need be employed.

The situation is not so simple in connection with the driven rotor 186, because in this case the abutments do not rotate with the rotor. The balancing force must be applied to the rotor or to means secured to and rotating therewith, in order to relieve unwanted bearing pressure.

In accordance with the present improvement, the driven rotor 186 is provided with rotor rings in the form of hub-like extensions 204 (Figs. 9 and 12) at each end of the rotor, these extensions being received and housed within mating chambers formed on the inside of the stationary abutments 196 and 198. The recessing of the stationary abutments is also shown at 201 in Fig. 27. Auxiliary ports 206 and 208 pass through the stationary abutments and open onto the rotor rings 204, as is best shown in Figs. 12 and 27.

Figure 11:
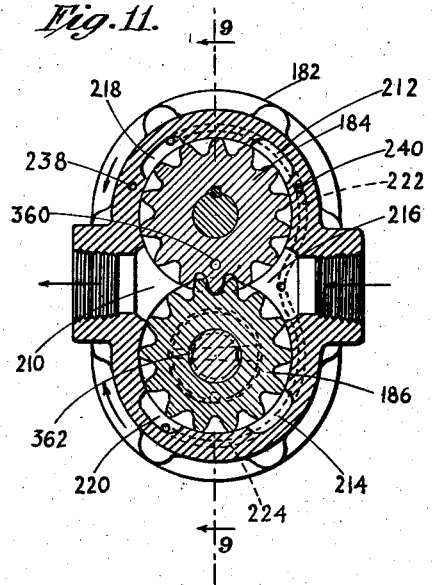
Fig. 11 is a section taken in the plane of the line 11—11 of Fig. 9.

Speaking in a qualitative rather than a quantitative way, the general nature of the forces dealt with is much as was previously described in connection with Figs. 1 through 8 of the drawings. Referring to Fig. 11, the discharge passage 210 communicates with main pressure ports 212 and 214, while the inlet passage 216 communicates with main suction ports 218 and 220. The channels connecting inlet port 216 with balance ports 218 and 220 are indicated at 222 and 224. These channels are formed on the inner face of flange 226 (Fig. 9) forming a part of the end wall 228 of the casing. The corresponding channels for the discharge passage are not visible in Fig. 11, because they are located in the opposite head or end plate 230 of the pump, but they are indicated in Fig. 9 at 232 and 234.

Figure 12:
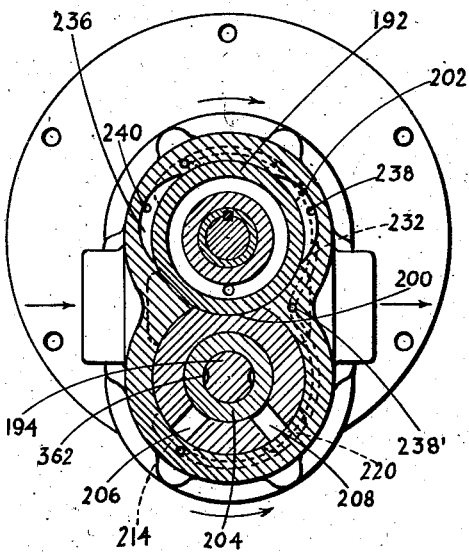
Fig. 12 is a section taken in the plane of the line 12—12 of Fig. 9.

Referring now to Fig. 12, and keeping in mind that this section is taken while looking in opposite direction, so that the directions of rotation are opposite those in Fig. 11, the auxiliary ports opening onto the abutment 192 are indicated at 202 and 236. Port 202 is a pressure port connected to the adjacent discharge passage, as is indicated by the pressure channel 232 and connecting hole 238. The port 236 is a suction port, and is connected to the adjacent inlet passage at the point 240, which is also shown in Fig. 11 as opening into the suction channel 222.

In respect to the driven rotor the auxiliary ports 206 and 208 (Figs. 12 and 15) are simply connected directly to the ends of the main balance ports 214 and 220 (Fig. 11) respectively. For this purpose the main balance ports are elongated axially of the casing. Thus in Fig. 10 the main balance port 220 is substantially longer in an axial direction than the ports 210 and 218, the ends of the ports 220 connecting directly with the outer ends of the ports 208 in the abutments. Similarly, the ends of the opposite port 214 connect directly with the ends of the auxiliary ports 206.

An equalizing hole 360 (Figs. 9 and 11) is provided through the driving rotor 212 and its abutments. Equalizing channels 362 (Figs. 9 and 12) are provided along the stationary shaft 194 of the driven rotor, and these communicate with holes 364 (Fig. 9) in the stationary abutments 196 and 198, by means of the spaces 366 at the ends of the hubs 204. These spaces 366 provide for equalization of pressure at the ends of the hubs, while the holes 364 provide for equalization of pressure outside the stationary abutments.

It will be observed that the application of auxiliary balance pressure to the driving rotor may be made far more conveniently than to the driven rotor. Moreover, it will be recollected from the vector analysis of Figs. 7 and 8, that the benefit obtainable from the auxiliary balance is greater in the case of the driving rotor than in the case of the driven rotor, for the corrective is applied to a larger and a more nearly uniform unbalance. It will be understood therefore, that if desired, a pump having abutments may be made with auxiliary ports opening onto the rotating abutments of the driving rotor, but devoid of auxiliary ports for the driven rotor. In this way an important corrective balance is obtained with but negligible additional complication and cost of manufacture.

The vector analysis previously given is not applicable to the pump of Fig. 9, but the method of analysis is applicable. In one respect, the analysis is simplified because when dealing with spur gears, the tooth edges in a development diagram such as Fig. 5 are vertical lines, and it becomes a little easier to determine the dimension and location of the effective area acted upon by the ports. On the other hand, in applying the desired correction to a pump having abutments, consideration must be given to the fact that the ports for the driving rotor open onto large-diameter abutments while the ports for the driven rotor open onto small-diameter hubs carried within the stationary abutments. The diameter does not enter directly into the computation except insofar as it affects the ability to conveniently obtain and locate the desired port area.

It will also be understood that the characteristics of the pumps shown in Figs. 1 and 9 may be combined. Specifically, hub-like extensions on a pump rotor devoid of abutments, such as are shown in Fig. 1, may be used with spur gears as well as with helical gears, and conversely, the abutments and modified auxiliary balancing ports, such as are shown in Fig. 9, may be used in a pump having helical instead of spur gears.

A problem which arises with spur gear pumps is that of trapping of liquid between the teeth. Referring to Fig. 16, it will be seen that the enclosed space 242 between the teeth is larger than the enclosed space 246. In changing from the position of Fig. 16 to that of Fig. 17, the liquid in space 242 is sought to be compressed to the volume of space 250. Meanwhile the space 246 has been enlarged, as is indicated at 252.

In accordance with the present invention, this difficulty is overcome by the provision of a series of radial slots 254, 256 on the inner face or end of abutments 192 and 195, as is best shown in Fig. 14. In Figs. 16 through 21, the driving rotor is shown at the bottom, and the edge of the rotating abutment is indicated by the line 258. The large slots 254 and the smaller slots 256 are also clearly shown. Furthermore, referring to Fig. 15, it will be seen that the stationary abutments 196 and 198 are provided with notches 260, 260', and these are indicated in Figs. 16 through 21, being defined by the broken line there shown. On studying the drawings, it will be seen that the slots are so spaced that they remain in communication with the notches 260, and thus prevent attempted compression of incompressible liquids between the teeth. On the other hand, the slots must at no time destroy the seal between the inlet and discharge sides of the pump.

Figs. 16 through 21 show successive meshing positions of the teeth. The lines of action of the two gears are represented in all the figures by the lines I—II and III—IV. Referring now to Fig. 16 alone, the teeth contact at the points 1, 310, 312. The space 242 between the tooth contact lines 1 and 310 decreases as the gears revolve, but inasmuch as the space 242 communicates with notch 260 through large slot 254, no trapping of liquid takes place. The space 246 between the tooth contact lines 310 and 312 increases as the gears revolve, but no suction is developed because the space 246 is in communication with the notch 260' through one of the small slots 256.

In Fig. 17 the space 250 confined between contact lines 314 and 316 is still in communication with the notch 260 through the large slot 254, and no trapping of liquid occurs, despite the reduction in volume from the space 242 of Fig. 16 to the space 250 of Fig. 17.

In changing from Fig. 17 to Fig. 18 the space is reduced still further to the minimum space 318 between the contact line 320 and 322, but its volumetric reduction from Fig. 17 to Fig. 18 is negligible, so that although the space 318 is not connected to either notch 260 or 260', there is no appreciable trapping of liquid.

In Fig. 19 the space has again increased to the space indicated at 324 enclosed between the contact lines 326 and 328, but the space 324 is now connected to notch 260' through the large slot 254. At the same time the space 330 between the contact lines 326 and 332 is connected to notch 260 through the small slot 256.

In Fig. 20 the space 334 enclosed between the contact lines 336 and 338 is still in communication with the notch 260 through the small slot 256. The space 340 between the contact lines 338 and IV communicates with the notch 260' through the large slot 254.

In Fig. 21 the space 340 enclosed between the contact lines 342 and 344 is at a minimum, but it has been reduced only very slightly from the volume which it had at the moment that slot 256 was cut off from notch 260, and therefore the trapping is not measurable and is ignorable. (In Fig. 20 the slot 256 still has some distance to go before being cut off.)

Another feature of my invention is concerned particularly with the production of a silent gear pump for high pressure work. Noise in a gear pump may be mechanical and hydraulic. To eliminate mechanical gear noise, it is preferable to use helical teeth, the lead being made at least equal to and preferably greater than one tooth pitch. Also, when helical teeth are used, the delivery from the pump may be made more nearly uniform, thus minimizing and even eliminating hydraulic pump noise arising from pulsating high pressure delivery.

I have found that to really eliminate hydraulic noise, it is not sufficient to merely provide helical teeth, and that instead, the relation of the length of the rotor to the lead is very important.

Referring to Figs. 22 through 24, I may point out that the discharge or delivery from the pump, while rotating through a differential angle $z$, is indicated by the area 270 (Fig. 22) when the upper rotor alone is delivering liquid. When the rotors are in the position of Fig. 23, and the delivery from both rotors is equal, the momentary quantitative amount of delivery for a differential movement $z$ may be represented by the areas 272 and 274. The sum of these areas is substantially greater than area 270. When the rotors are in the position of Fig. 24, and the lower rotor alone is delivering liquid, the momentary quantity of delivery, during a differential rotation $z$, may be represented by the area 276 which is the same as the area 270, and substantially less than the sum of the areas 272 and 274. The change from Fig. 22 to Fig. 23, and from Fig. 23 to Fig. 24 is only one-fourth of a tooth pitch, the total change being only one-half of a tooth pitch. This condition applies to a spur gear or to any infinitesimally thin slice of helical gear, for a helical gear is made up of a series of such slices of spur gear which are rotatably displaced from one another.

Referring now to Fig. 25, the variation or pulsation in delivery from a spur gear or a slice of helical gear, may be represented by the curve 280, the entire length of which corresponds to the movement of a single pitch, there being two maximums and two minimums during this movement. The delivery from an adjacent slice of gear displaced, for instance, by $1/_{48}$ of a pitch, is represented by the curve 282. This may be drawn by simply displacing the curve 282 relative to the curve 280. Similarly, the curve 284 is displaced by ⅛ of a pitch; the curve 286 by 3/16 of a pitch; the curve 288 by ¼ of a pitch; the curve 290 by 5/16 of a pitch; the curve 292 by ⅜ of a pitch; and the curve 294 by 7/16 of a pitch. The next curve, if drawn, would correspond to the first curve, that is, the curve 280, for the curve repeats itself in a half pitch.

On adding the curves, it will be found that the resultant is a straight line, signifying perfectly uniform delivery. This desirable straight line is obtainable in an axial length producing a lead of one-fourth of a pitch, but is not obtainable in anything less. Thus, referring to Fig. 26, the first part of curve 294 in Fig. 25 is duplicated at 294 in Fig. 26. On adding thereto the first part of curve 292, there is obtained a resultant curve 296, and on then adding the first part of curve 290, there is obtained a resultant curve 298. On adding the first part of curve 288, the resultant is curve 300. On adding the first part of curve 284 the resultant is curve 304. On adding the first part of curve 282 the resultant is curve 306. In none of these cases has a uniform delivery been obtainable. However, on now adding the first part of curve 280, the resultant is the straight line 308 which represents a perfectly uniform delivery.

From this analysis, I conclude that to eliminate hydraulic noise, the length of the rotor should be such that the lead terminates to the nearest one-quarter pitch.

The minimum rotor length must be such that the leads equal one pitch. This is necessary for mechanical reasons in order to obtain the benefit of continuous helical gear mesh. However, in designing the pump it may be necessary to use a much longer rotor in order to obtain adequate pump capacity. If the computed length of the rotor comes out, say, such as to make the tooth lead 1⅝ pitches, the rotor should be increased in length to 1¾ pitches (or if it is not necessary to meet an exact capacity requirement, it might be reduced to one and one-half pitches). In any event, the length of the rotor should be selected to the nearest one-quarter pitch if perfectly uniform delivery with no hydraulic noise or hum is to result.

It will be understood that the foregoing analysis is applicable to a helical tooth sloping in one direction. In practice, the rotor is provided with herringbone teeth which slope in opposite directions, so as to avoid axial thrust. In the specific case given above, the capacity referred to is one-half the total capacity of the pump, and the actual rotor length will be twice that indicated.

It is believed that the construction and operation of my improved gear pump, as well as the many advantages thereof, will be apparent from the foregoing detailed description thereof. The pump is radially balanced by main balancing ports, and is additionally balanced by auxiliary balancing ports operating upon special rotor rings, or upon axially movable abutments when such abutments are anyway used in the pump. Appropriate slots and notches may be provided to relieve trapped liquid from between the gear teeth, and these are preferably formed in the abutments, thus avoiding mutilation of the gear teeth and consequent weakening and rapid wear of the same. In the case of a helical gear pump, the rotor length may be so selected as to produce uniform delivery and to eliminate hydraulic noise.

It will be observed that the edges of the inlet pumping port and the leading edges of the connected balance ports are separated circumferentially by a distance corresponding substantially to an integral multiple of one tooth pitch. The result is that the exposed inlet pumping port area on one rotor and the connected balancing port area on the same rotor are simultaneously decreased by one tooth space. It will also be noted that the edges of the discharge pumping port and the trailing edges of the connected balance ports are separated circumferentially by a distance corresponding substantially to an integral multiple of one tooth pitch. As a result of this the exposed discharge pumping port area on one rotor and the connected balancing port area on the same rotor are simultaneously increased by substantially one tooth space.

It will also be understood that while I have shown and described my invention in several preferred forms, many changes and modifications may be made in the structures disclosed, without departing from the spirit of the invention defined in the following claims.

I claim:

1. Device of the class described comprising a casing, a driving rotor, a driven rotor, an inlet passage, a discharge passage, main balancing ports in said casing connected to said discharge passage and opening onto said rotors at points opposite the discharge passage, auxiliary rotor rings secured to and rotating with said rotors, auxiliary balancing ports connected to said discharge passage and opening onto said rotor rings, the auxiliary ports for the driving rotor being located opposite the inlet passage, and the auxiliary ports for the driven rotor being located opposite the discharge passage.

2. A device of the class described comprising a casing, a driving rotor, a driven rotor, an inlet passage, a discharge passage, main balancing ports in said casing connected to the inlet passage and opening onto said rotors at points opposite the inlet passage, auxiliary rotor rings secured to and rotating with said rotors, auxiliary balancing ports connected to said inlet passage and opening onto said rotor rings, the auxiliary ports for the driving rotor being located opposite the discharge passage, and the auxiliary ports for the driven rotor being located opposite the inlet passage.

3. A device of the class described comprising a casing, a driving rotor, a driven rotor, an inlet passage, a discharge passage, two main balancing ports in said casing opening onto each of said rotors, auxiliary rotor rings secured to and rotating with said rotors, two auxiliary balancing ports opening onto each of said rotor rings, means connecting the inlet passage to the remote main balancing ports of both rotors and to the remote auxiliary balancing port of the driven rotor and to the adjacent auxiliary balancing port of the driving rotor.

4. A gear pump comprising a casing, driving and driven rotors of the spur gear type, an inlet passage, a discharge passage, a cylindrical abutment secured at the end of the driving rotor and rotating therewith, said abutment being axially movable in the casing to accommodate expansion of the rotor, and means to prevent trapping of liquid between the meshing teeth of the rotors, said means comprising radial slots formed between the end of the driving rotor and the adjacent end of the abutment.

5. A gear pump comprising a casing, driving and driven rotors of the spur gear type, an inlet passage, a discharge passage, a cylindrical abutment secured at the end of the driving rotor and rotating therewith, said abutment being axially movable in the casing to accommodate expansion of the rotor, and means to prevent trapping of liquid between the meshing teeth of the rotors, said means comprising radial slots formed between the end of the driving rotor and the adjacent end of the abutment, said radial slots being cut into the abutment, thereby leaving the bearing surfaces of the teeth unimpaired.

6. In the design of a helical gear pump, the method of obtaining uniform delivery and avoiding hydraulic noise which includes selecting the axial dimension of the rotor in increments equivalent to increments of lead equalling one-quarter of the tooth pitch.

7. In the design of a helical gear pump, the method of obtaining uniform delivery and avoiding pump noise which includes selecting the axial dimension of the rotor by using as a minimum a length which will produce a tooth lead equal to one tooth pitch and thereafter adding any additional length needed for adequate pump capacity in one-quarter pitch increments of lead.

8. A gear pump comprising a casing, driving and driven rotors of the spur gear type, an inlet passage, a discharge passage, cylindrical abutments secured at the ends of the driving rotor and rotating therewith, said abutments being axially movable in the casing to accommodate expansion of the rotor, and means to prevent trapping of liquid between the meshing teeth of the rotors, said means comprising radial slots formed between the ends of the driving rotor and the adjacent ends of the abutments, said radial slots being cut into the abutments, thereby leaving the bearing surfaces of the teeth unimpaired.

9. A radially balanced gear pump comprising a casing, a driving rotor, a driven rotor, an inlet passage, a discharge passage, main balancing ports in said casing opening onto said rotors, fluid flow passages connecting said main balancing ports with said inlet and discharge passages in order to help balance the rotors, auxiliary balance rings secured to and rotating with said rotors, auxiliary balancing ports opening onto said balance rings, and fluid flow passages connecting said auxiliary balancing ports with said inlet and discharge passages, said auxiliary balancing ports being so located and dimensioned as to help compensate for residual unbalance remaining despite use of the main balancing ports.

10. A device of the class described comprising a casing, a driving rotor, a driven rotor, auxiliary balance rings in the form of hub-like extensions on the rotors, said casing being so dimensioned as to fit closely about the rotors and hubs, inlet and discharge passages in said casing, main balancing ports in said casing opening onto said rotors, fluid flow passages connecting said main balancing ports with said inlet and discharge passages to help balance the rotors, auxiliary balancing ports opening onto said hub-like extensions, and fluid flow passages connecting said auxiliary balancing ports with said inlet and discharge passages to help counteract residual unbalance remaining despite use of the main balancing ports.

11. A device of the class described comprising a casing, a driving shaft, a driving rotor mounted thereon, cylindrical abutments rotating with said shaft and rotor but affording axial movement for temperature expansion, a driven rotor, inlet and discharge passages in said casing, main balancing ports in said casing opening onto said rotors, fluid flow passages connecting said main balancing ports with said inlet and discharge passages, auxiliary balancing ports opening onto the rotating abutments, and fluid flow passages connecting said auxiliary balancing ports with said inlet and discharge passages, said auxiliary balancing ports being so located and dimensioned as to help counteract residual unbalance remaining despite use of the main balancing ports.

12. A device of the class described comprising a casing, a driving shaft, a driving rotor mounted thereon, a driven rotor, abutments at the ends of one of said rotors affording axial movement for temperature expansion, inlet and discharge passages in said casing, main balancing ports in said casing opening onto said rotors, fluid flow passages connecting said main balancing ports with said inlet and discharge passages, hub-like extensions on the aforesaid rotor having abutments, said extensions being received within mating chambers formed in the abutments, auxiliary balancing ports leading through said abutments and opening onto said hub-like extensions, and fluid flow passages connecting said auxiliary balancing ports with said inlet and discharge passages, said auxiliary balancing ports being so located and dimensioned as to help counteract residual unbalance remaining despite use of the main balancing ports.

13. A device of the class described comprising a casing, a driving shaft, a driving rotor mounted thereon, cylindrical abutments rotating with said shaft and rotor but affording axial movement for temperature expansion, a stationary shaft, a driven rotor rotatable thereon, non-rotatable abutments at the ends of said driven rotor, said non-rotatable abutments being cut away to receive the rotating abutments, inlet and discharge passages in said casing, main balancing ports in said casing opening onto said rotors, fluid flow passages connecting said main balancing ports with said inlet and discharge passages, auxiliary balancing ports opening onto the rotating abutments, rotor rings on said driven rotor received in mating parts of the non-rotatable abutments, auxiliary balancing ports opening onto said rotor rings, and fluid flow passages connecting said auxiliary balancing ports with said inlet and discharge passages, said auxiliary balancing ports being so located and dimensioned as to help counteract residual unbalance remaining despite use of the main balancing ports.

14. A radially balanced gear pump comprising a casing, a driving shaft, a driving rotor mounted thereon, cylindrical abutments rotating with said shaft and rotor but affording axial movement for temperature expansion, a stationary shaft, a driven rotor rotatable thereon, non-rotatable abutments at the ends of said driven rotor, said non-rotatable abutments being cut away to receive the rotating abutments, inlet and discharge passages in said casing, main balancing ports in said casing opening onto said rotors, fluid flow passages connecting said main balancing ports with said inlet and discharge passages, auxiliary balancing ports opening onto the rotating abutments, hub-like extensions on said driven rotor received within mating chambers formed within the non-rotatable abutments, auxiliary balancing ports leading through said non-rotatable abutments and opening onto said hub-like extensions, and fluid flow passages connecting said auxiliary balancing ports with said inlet and discharge passages, said auxiliary balancing ports being so located and dimensioned as to help counteract residual unbalance remaining despite use of the main balancing ports.

15. A radially balanced gear pump of the class described, comprising a casing, a driving rotor, a driven rotor, an inlet pumping port, a discharge pumping port, balancing ports in said casing opening onto the rotors, means connecting said inlet pumping port to balancing ports located substantially diametrically opposite said inlet pumping port, means connecting said discharge pumping port to balancing ports located substantially diametrically opposite said discharge pumping port, the edges of said inlet pumping port and the leading edges of the connected balance ports being separated circumferentially by a distance corresponding substantially to an integral multiple of one tooth pitch, whereby the exposed inlet pumping port area on one rotor and the connected balancing port area on the same rotor are simultaneously decreased by substantially one tooth space, and the edges of said discharge pumping port and the trailing edges of the connected balance ports being separated circumferentially by a distance corresponding substantially to an integral multiple of one tooth pitch, whereby the exposed discharge pumping port area on one rotor and the connected balancing port area on the same rotor are simultaneously increased by substantially one tooth space.

GUSTAVE A. UNGAR.